R. C. STURDEVANT.
WIRE STRETCHER.
APPLICATION FILED JUNE 24, 1913.
1,154,456.
Patented Sept. 21, 1915.
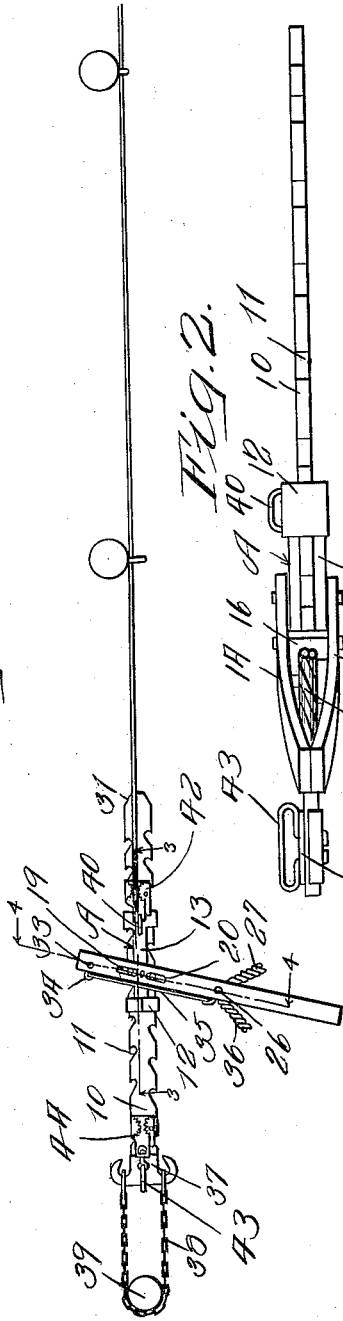
Witnesses
Inventor
R. C. Sturdevant
By
Attorneys

UNITED STATES PATENT OFFICE.

ROMA C. STURDEVANT, OF WELDON, IOWA.

WIRE-STRETCHER.

1,154,456.　　　　Specification of Letters Patent.　　Patented Sept. 21, 1915.

Application filed June 24, 1913. Serial No. 775,571.

*To all whom it may concern:*

Be it known that I, ROMA C. STURDEVANT, a citizen of the United States, residing at Weldon, in the county of Decatur, State of Iowa, have invented certain new and useful Improvements in Wire-Stretchers; and I do hereby declare the following to be a full, clear, and exact description of the invention, such as will enable others skilled in the art to which it appertains to make and use the same.

This invention relates to wire stretchers.

The object of the invention resides in the provision of a wire stretcher which will be simple in construction, easily and quickly operated, efficient in use and which may be manufactured at comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view showing the improved stretcher operatively applied; Fig. 2, a side view of what is shown in Fig. 1; Fig. 3, a section on the line 3—3 of Fig. 1; Fig. 4, a section on the line 4—4 of Fig. 1; Fig. 5, a section on the line 5—5 of Fig. 4, and Fig. 6, a detail perspective view of the notched bar employed in the wire stretcher.

Referring to the drawings the wire stretcher is shown as comprising a bar 10 which has formed in each side edge notches 11, the notches in one side edge being disposed in staggered relation to the notches in the other side edge. Slidable on the bar 10 is a frame A which includes rectangular end portions 12 connected together by side members 13. The operating lever of the stretcher is shown as comprising a pair of bars 14 and 15 contracted at one end and separated at their other ends by blocks 16 and 17. The bars 14 and 15 of the operating lever are disposed in embracing relation to the bar 10 and the side members 13 of the frame A, said bars 14 and 15 being pivotally connected to the side members 13 respectively at 18. The bars 14 and 15 are provided between the pivots 18 and the block 17 with alined slots 19 respectively, while said bars 14 and 15 are further provided between the pivots 18 and the block 16 with alined slots 20 respectively. Slidably mounted in the block 16 is a stem 21 which terminates at the end adjacent the bar 10 in a forked portion including arms 22 and 23. Rotatably mounted in the arms 22 and 23 is a roller 24 the trunnions of which are extended through the slots 20 of the bars 14 and 15. Encircling the stem 21 and interposed between the blocks 16 and the forked end of said stem is a coil spring 25 which constantly tends to move the stem 21 toward and the roller 24 into engagement with the adjacent edge of the bar 10. Connecting the bars 14 and 15 between the blocks 16 and the contracted ends of said bars is a rod 26 on which is pivoted an angle lever 27 connected to the adjacent end of the stem 21 so that when said lever is moved toward the bars 14 and 15 the stem 21 will be operated against the influence of the spring 25 and the roller 24 drawn out of engagement with the adjacent edge of the bar 10. Slidably mounted in the block 17 is a stem 28 which has the end thereof adjacent the bar 10 forked to form arms 29 and 30. Rotatably mounted in the arms 29 and 30 is a roller 31 the trunnions of which are extended through the slots 19 of the bars 14 and 15. Encircling the stem 28 between the block 17 and the forked end of said stem is a coil spring 32 which constantly tends to move the stem 28 so as to hold the roller 31 in engagement with the bar 10. Connecting the bars 14 and 15 outwardly of the block 17 is a rod 33 upon which is pivoted a two armed lever 34. One end of this lever 34 is connected to the adjacent end of the stem 28, while the other end thereof is connected by a link 35 to an angle lever 36 pivoted on the rod 26. By this construction it will be apparent that when the long arms of the angle levers 27 and 36 are operated simultaneously toward the bars 14 and 15 the rollers 24 and 31 will be simultaneously moved out of engagement with the bar 10 so as to permit free sliding movement of said bar in the frame A. Secured to one end of the bar 10 is a double hook 37 to which is adapted to be detachably connected a chain 38 whereby said bar may be secured to an anchor post 39. Also secured to the bar 10 is an eye member 43 to which is swiveled a wire clamp 44. On the frame A remote from the hook 37 is an eye member 40 to which is attached a wire clamp 42.

In the use of the device same is connected to an anchor post and wire as shown in Fig. 1. The lever formed by the bars 14 and 15 is then oscillated. During this movement of the operating lever the rollers 24 and 31 will successively engage in the notches 11 on the adjacent side of the bar 10. In this manner the fulcrum of the operating lever will be successively advanced with the result that the frame A will be moved along the bar 10 and the wire fence efficiently stretched. To reset the device it is only necessary to secure the wire to the clamp 44, operate the levers 27 and 36 in the manner heretofore referred to and slide the frame A to the other end of the bar 10.

What I claim is:—

A wire stretcher comprising a bar having notches in each side edge, the notches in one edge being staggered with respect to those in the other edge, a frame slidable on said bar, an operating lever including spaced portions embracing the bar and frame and pivotally connected to opposite sides of the frame respectively and further having alined slots adjacent each side edge of the bar, spring pawls slidably mounted between the spaced portions of the lever adjacent the side edges of the bar respectively, each of said pawls comprising a stem having its inner end forked, a roller journaled between the arms of said forked end adapted to engage in the notches in the adjacent edge of the bar, and the trunnions of said rollers being extended through the alined slots of the lever, spring means constantly tending to move said stems toward the bar to engage the rollers in the respective notches, a pivot rod mounted on the lever and connecting the space portions thereof, a pair of pawl operating levers each formed from a length of wire bent to produce double loops at one end of each lever, one of the loops of one lever being pivoted on said pivot rod and the other end connected to the adjacent spring pawl, a rocker arm pivoted between the portions of said lever and having one end connected to the other spring pawl, and one of the loops of the other pawl operating lever being pivotally engaged over the pivot rod, a link connecting the other loop of the last named lever with said rocker arm, and means for attaching one end of the bar to a fixed part and the opposite end to the frame of a wire clamp.

In testimony whereof, I affix my signature, in the presence of two witnesses.

ROMA C. STURDEVANT.

Witnesses:
C. H. FISHER,
W. H. CARLAN.

Copies of this patent may be obtained for five cents each, by addressing the "Commissioner of Patents. Washington, D. C."